United States Patent
Morgan et al.

[15] 3,687,035
[45] Aug. 29, 1972

[54] IMAGE MOTION COMPENSATION MEANS FOR CAMERA APPARATUS

[72] Inventors: Robert A. Morgan, 402 Oak Grove Ave., Menlo Park; Fred E. Tarver, San Jose, both of Calif.

[73] Assignees: R. A. Morgan Co., Inc., by said Morgan; Morgan Information Systems, Inc., Palo Alto, Calif. ; by said Tarver

[22] Filed: Aug. 11, 1969

[21] Appl. No.: 849,049

[52] U.S. Cl. ..................................95/12.5, 356/24
[51] Int. Cl. ............................................G03b 29/00
[58] Field of Search ..........................95/12.5; 356/24

[56] References Cited
UNITED STATES PATENTS
3,158,079  11/1964  Willits et al.................95/12.5
3,491,668  1/1970  Hillman......................95/12.5

Primary Examiner—Samuel S. Matthews
Assistant Examiner—Richard L. Moses
Attorney—Harvey G. Lowhurst

[57] ABSTRACT

An image motion compensation system for aerial cameras and the like, comprising an optical V/H meter, the scanning speed of which is utilized to provide proportional control of the film drive means of the camera apparatus so as to provide automatic image motion control in response to a selected scanning speed of the V/H meter. The optical V/H meter employs an objective scanning mirror device having a scanning rate which can be selectively varied to cause the photographic image to appear stationary in the image plane thereof.

14 Claims, 3 Drawing Figures

Patented Aug. 29, 1972
3,687,035
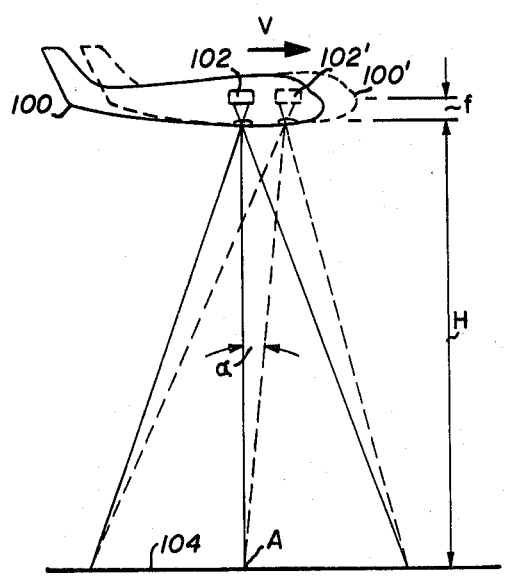
Fig_1
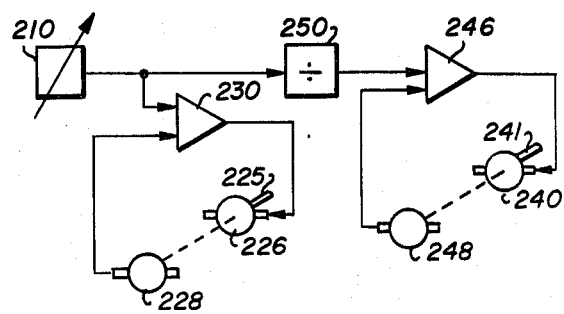
Fig_3
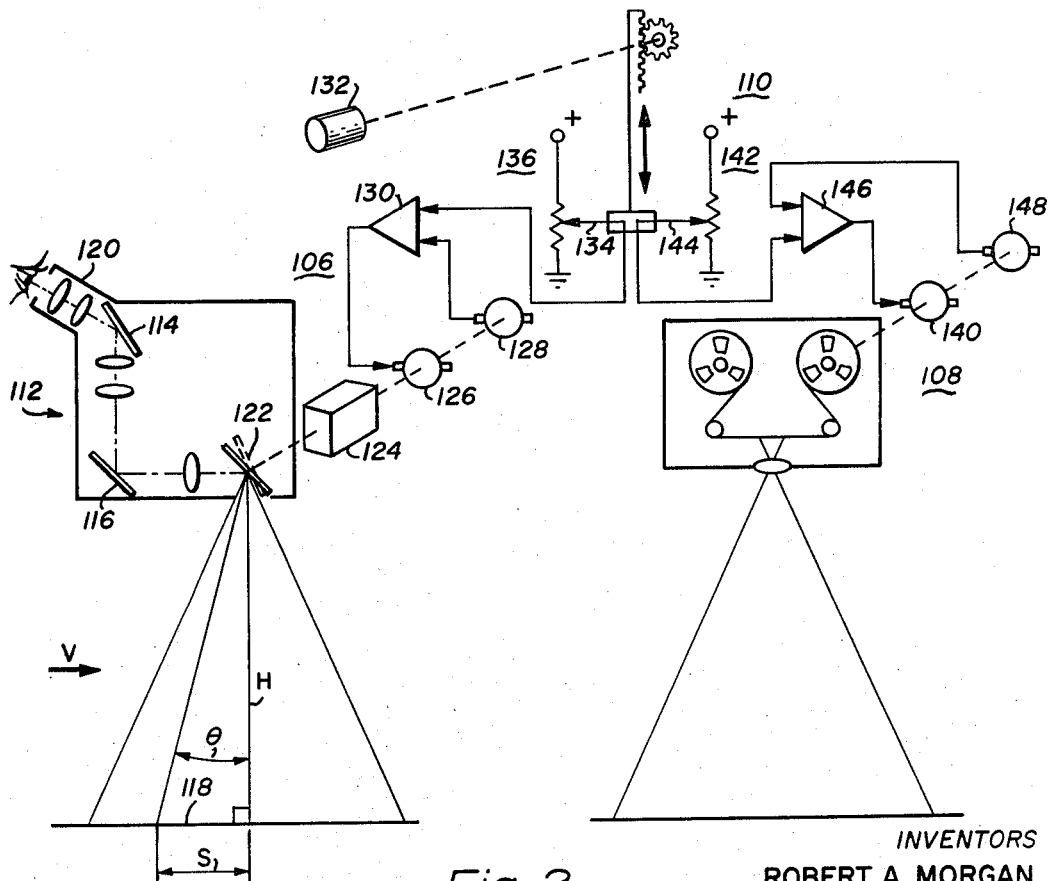
Fig_2
INVENTORS
ROBERT A. MORGAN
FRED E. TARVER
BY
ATTORNEY

IMAGE MOTION COMPENSATION MEANS FOR CAMERA APPARATUS

BACKGROUND OF THE INVENTION

The present invention relates generally to motion photography apparatus and, more particularly, to an optical means for controlling the image motion compensation apparatus of a camera designed to photograph objects continuously moving relative to the camera.

One of the principal problems involved in aerial photography and other forms of photography in which the object moves with relation to the camera is the exposure blur caused by the relative motion during the time the shutter is open. Image motion compensation (IMC) apparatus must therefore be provided for causing the film to move with relation to the camera aperture so as to compensate for the relative movement. In the case of aerial photography, the required IMC speed is $$IMC\ Speed = Vf/H$$

where $V$ is the ground speed of the aircraft, $f$ is the focal length of the camera, and $H$ is the altitude of the camera above the photographic object.

Heretofore, in order to provide the required IMC, a motorized film drive means has been utilized in the camera to drive the film during exposure at some constant speed in accordance with the above equation. The parameters of the equation are determined by separately measuring the ground speed and altitude using on-board apparatus or by the electronic technique of measuring image movement. The focal length $f$ is, of course, determined by the characteristics of the camera. These methods are both complicated and require multiple computation, even notwithstanding the likelihood of compounding measurement errors. Where the airborne camera is to be utilized to survey, at low altitude, objects such as river beds, road beds, power line insulators, and the like, it is very difficult to obtain accurately, the parameters required to determine the V/H ratio because of the proportionate inaccuracy of aircraft instruments at low altitudes. Furthermore, where the objects to be photographed are not at ground level and are in fact arbitrarily positioned relative to the ground elevation, the difficulty is greatly accentuated. Consequently, it is in many cases nearly impossible to obtain sharp low altitude photographs of certain desired objects using the prior art IMC methods.

OBJECTS OF THE INVENTION

It is therefore a principal object of the present invention to provide a novel IMC system for motion camera apparatus having optical means for measuring directly the V/H ratio, such means being operatively coupled to the film speed control means of the camera apparatus so that proper synchronization of the optical means automatically selects the proper IMC speed to prevent blurring of the image.

Another object of the present invention is to provide an electrical image motion compensation means for a camera apparatus which is responsive to an optical V/H meter so as to enable accurate photography to be made of visually selected objects without requiring that relative speed and separation be measured independently.

Still other objects of the present invention will become apparent to those of skill in the art after having read the following description of a preferred embodiment of the invention.

SUMMARY OF THE INVENTION

In accordance with the present invention, an optical V/H meter and the image motion compensation drive means of an aerial camera apparatus, or the like, are operatively coupled together so that by synchronizing the desired photographic object in the image plane of the optical V/H meter, image motion compensation for the camera apparatus is automatically achieved. The optical V/H meter apparatus employs an objective scanning mirror device having a scanning rate which can be selectively varied to cause the photographic image to appear stationary in the image plane of the meter. And since both the scanning rate of the mirror and the IMC speed are directly related to the V/H ratio, the speed controls for the respective drive means are ganged together so that adjustment of the optical V/H meter automatically adjusts the IMC speed to the proper setting.

The apparatus of the present invention is extremely useful whenever relatively long exposure times are required. For example, as at dusk or dawn, for night photography, where color film is being used, or when light limiting filters are used for photographing in selected spectral regions. Furthermore, the apparatus is particularly useful for fast, low level aerial photography wherein the requirement for precise image motion compensation is quite severe. Moreover, the apparatus is well adapted for use in systems which take a long continuous picture instead of separate frames as in performing detailed pictorial reconnaissance of river banks, highways, transmission lines, roadways and proposed rights of way.

IN THE DRAWING

FIG. 1 is a schematic diagram illustrating the basis for the requirement that image motion compensation means be provided in aerial photography apparatus.

FIG. 2 is a schematic diagram of an image motion compensation apparatus in accordance with the present invention.

FIG. 3 is a schematic diagram of an alternate proportional IMC speed control system in accordance with the present invention.

DETAILED DESCRIPTION OF THE PRESENT INVENTION

The subject matter disclosed in the U.S. Pat. to W. Smith et al., U.S. Pat. No. 3,175,459 issued Mar. 30, 1965 is hereby incorporated by reference into the specification of the present application and relates to a meter for gauging the flow velocity of water flowing in a stream or river channel.

In FIG. 1 of the drawing of the present application, an aircraft is illustrated at 100 which carries a camera 102 for aerially photographing the terrain identified at 104. Since the shutter of the camera 102 is open for a finite period of time that is determined by the conditions under which the photography is being made, as well as the type of equipment being used, it will be apparent that, since the plane is moving at a velocity V relative to the photographic object 104, during the exposure time the plane 100 will have moved to the position shown by the dashed lines 100' and thus, the camera likewise will have been moved to the position shown by the dashed lines 102'. Accordingly, the light rays from the point A will no longer enter the camera 102 along the optical axis but will be shifted therefrom by some angle α so that the position of the image produced on the film in the camera 102 will be shifted slightly during the period of exposure. This will, of course, cause the exposure to be blurred unless some means is provided for compensating for the image displacement.

Although means have heretofore been provided for solving this problem, they have generally required that inputs from the aircraft instruments for measuring the velocity V and the altitude H be fed into a V/H computer which drives a film advance motor in the camera. However, in accordance with the present invention, image motion compensation is provided by an apparatus, such as is illustrated schematically in FIG. 2, that includes an optical V/H meter 106 which enables the V/H ratio between the camera and the photographic object to be determined directly. In order that the aerial camera 108 be properly adjusted, a ganged adjustment mechanism 110 is provided for simultaneously adjusting the drive motors of the optical apparatus 106 and of the film in camera 108. Thus, by operating a single control 132 the operator can select the proper IMC speed for the camera 108.

Although a more detailed description of an optical flowmeter of the type incorporated into the present disclosure may be found in the above incorporated Smith et al patent disclosure, the basic optical apparatus used in the present invention is schematically illustrated at 106 in FIG. 2. The optical V/H meter has an optical system 112 including a pair of mirrors 114 and 116 for imaging the photographic objects 118 into the viewing window formed by eyepiece 120 as it is reflected thereinto by the oscillating mirror 122.

The oscillating mirror 122 is oscillated in a prescribed nonlinear manner, which will be described below, by a suitable cam or gear drive apparatus 124 or other suitable mechanism that is driven by a motor 126. The motor 126 also drives a tachometer generator 128, the output of which is fed into a summing amplifier 130 that causes the speed of the motor 126 to be maintained constant at a selected value. The rotational speed of the motor 126 is selected by turning a knob 132 that is geared to move the wiper 134 of a potentiometer 136 which regulates the power supplied, in the form of a first drive signal to the motor 126 via the summing amplifier 130

The photographic object 118, which in this case may be the ground or any object above the ground, will appear to remain stationary in the field of view of the eyepiece as the aircraft moves to the right with velocity V if the angular displacement of the mirror 122 is synchronized with the velocity of the plane according to the relationship derived below. At any instant $$S = H \tan \theta \tag{1}$$

where $S$ is the horizontal distance along the object plane, $H$ is the vertical distance from the mirror 122 to the object 118 and $\theta$ is an instantaneous angle of view measured from the vertical. Since $$V = ds/dt \tag{2}$$ then $$= d(H \tan \theta)/dt$$

or $$V = H \sec^2 \theta \, d\theta/dt \tag{3}$$

where $d\theta/dt$, or $W$ is equal to the rate of change of the observer's line of sight due to the movement of the mirror 122.

Substituting $d\theta/dt = W$ in (3)

$$W = V/(H \sec^2 \theta) \tag{4}$$

$$= (V/H)\cos^2 \theta$$

And because of the double deviation of the line of sight at the mirror 122, the line of sight will follow a point on the photographic surface if the mirror moves at an angular velocity $\omega$ which may be expressed as $$\omega = W/2 \tag{5}$$

$$= V/2H \cos^2 \theta$$

Since the functional relationship ½cos² $\theta$ may be obtained by driving the mirror 122 either in reciprocating oscillatory fashion, i.e., by rotating it alternately clockwise and counterclockwise through a suitable angle of rotation, or in accordance with the methods and apparatus described in detail in the Smith et al. patent, the ratio V/H is determined directly when the image is stopped in the field of view by choosing the appropriate average drive motor speed.

As set forth above, the image motion compensation speed at which the film of the aerial camera 108 must be advanced may be obtained in accordance with the relationship $$\text{IMC speed} = Vf/H \tag{6}$$

where $V$ is the aircraft ground speed, $f$ is the focal length of the camera and $H$ is the altitude above the photographic object. And since the drive speed of the motor 126 used to oscillate the mirror 122 is proportional to V/H it will be seen that once the film advance drive motor 140 is properly synchronized with the motor 126, the relationship between the two motors for any increase or decrease in rotational speed is linear. Thus, in order to cause a change in the rotational speed of the film advance motor 140 which is proportional to the change in rotational speed of the optical drive motor 126, a potentiometer 142 can be utilized which has its wiper 144 ganged with the wiper 134 of the potentiometer 136 and supplies a second drive signal.

As in the speed control circuit for the motor 126, the potentiometer 142 controls the power supplied to the motor 140 via the differential amplifier 146. Also similarly, a tachometer generator 148 is driven by the motor 140 and the output thereof is fed back into the differential amplifier 146 to maintain the speed of the motor 140 constant at the selected value commesurate with a second drive signal. Thus, with the wipers 134 and 144 so arranged, a turn of the optical adjustment knob 132 causes the potentiometers 136 and 142 to be simultaneously adjusted to produce proportional changes in the rotational speeds of motors 126 and 140, thereby enabling the IMC speed of the film drive 140 of camera 108 to be optically selected by merely turning the knob 132 to stop the image viewed in the eyepiece 120.

Referring now to FIG. 3 of the drawing, there is shown in schematic block diagram form an alternative proportional speed control means which may be utilized in accordance with the present invention. In this embodiment, a variable power supply 210 is provided which may be of any suitable form capable of providing variable output power. The output of the supply 210 forms a first drive signal which is coupled directly into one of the inputs of a differential amplifier 230, the output (first drive signal) of which is connected to a motor 226 that drives the scanning mirror of the V/H meter via shaft 225. Also coupled to the output of the motor 226 is a tachometer generator 228, the output of which is coupled into another input of the differential amplifier 230 so as to maintain the speed of motor 226 constant at a selected value.

The output of the variable power supply 210 is fed through a divider 250 which develops a second drive signal. The divider 250 modifies the power supplied to the film drive motor 240 so that the motors 240 and 226 are always energized in accordance with a predetermined relationship. The film drive motor 240 advances the film during exposure via drive shaft 241. Also coupled to motor 240 is a tachometer generator 248, the output of which is fed back into the differential amplifier 246 for maintaining the speed of the motor 240 constant at the selected value. The purpose of this simplified control diagram is to illustrate that any proportional motor control system can be utilized to operatively couple the drive means of the V/H meter 106 (see FIG. 2) with the film drive of the camera apparatus 108 so as to form novel combination of the present invention.

As an alternative to varying the drive speed of the camera film, the camera 108 itself may be mounted on trunnions so as to be rotated at the proper speed, as determined by the aforementioned principles, in order to compensate for the image movement. Rotation of the entire camera about a suitable axis would accomplish the same end as does movement of the film relative to the exposure aperture. For example, if during movement from the position 102 shown in FIG. 1 to the position 102' the camera is tilted so that its principal optical axis continuously intercepts point A, then the same effect is achieved. But note that the time required to tilt camera 102 back to a starting angular disposition (with its optical axis intercepting another reference point) will prevent truly continuous operation or will result in the introduction of short film segments of blurred images depending, of course, on the time required to return it to the starting position. Selsyn motors or any other suitable control linking means may be used to accomplish the objectives set forth above.

Although the field of view of the camera 108 and the optical V/H meter are shown separated, it is to be understood that in actuality they are positioned quite close together so that the image scanned by the mirror 122 is substantially identical to that to which the camera film is exposed. Although the invention has been disclosed with particular regard to an aerial photography system, it is to be understood that it can just as well be applied to any type of photography wherein IMC is required to compensate for relative motion and/or relative separation between camera and photographic object. It is therefore to be understood that we do not intend that the invention be limited to the preferred embodiments. We do, however, intend that the appended claims be interpreted as including all alterations and modifications which fall within the true spirit and scope of our invention.

What is claimed is:

1. In an aerial photography system including an aerial camera apparatus having image motion compensation means including a film drive means the operation of which may be selectively controlled, an improved image motion compensation means comprising:

an optical V/H meter including as an operative component thereof an object scanning mirror apparatus disposed along the optical axis thereof, said mirror being driven by a mirror drive means the operational frequency of which is selective, said V/H meter being of the type that causes the image of a moving object to appear to remain stationary when the angular speed of said scanning mirror has a predetermined relationship to the ratio of the relative speed V, of the meter with respect to the object, and the distance H therebetween; and control means for simultaneously varying the input signals to said mirror drive means and said film drive means in accordance with a predetermined relationship so as to provide accurate image motion compensation for said camera means at any time that said V/H meter is correctly adjusted.

2. In an aerial photography system as recited in claim 1 wherein said control means includes a pair of potentiometers for respectively controlling the inputs signals to said mirror drive means and said film drive means, the wipers of said potentiometers being ganged together and driven in response to a single control so as to produce proportional changes in the power supplied to said mirror drive means and said camera drive means.

3. In an aerial photography system as recited in claim 1 wherein said control means includes a variable power supply means the output of which is directly coupled to energize one of said drive means and is coupled through a signal divider means to energize the other of said drive means.

4. In a photography system having means for compensating for relative motion between the camera and a photographic object, an improved image motion compensation means comprising:

a variable control means for developing a first drive signal and a second drive signal proportional thereto;

an optical means including, a viewing window, a rotatably mounted mirror for reflecting an image of the relatively moving object into said viewing window, and a mirror drive means responsive to said first drive signal and operative to rotate said mirror at a rate which causes said image to appear stationary when said first drive signal is proportional to the ratio of the velocity of relative movement and the distance between said system and the object; and a camera including, an exposure aperture, and a film drive means responsive to said second drive signal and operative to move a photographic film relative to said exposure aperture at a motion compensated speed.

5. In a photography system as recited in claim 4 wherein said variable control means includes a pair of potentiometers for respectively developing said first and second drive signals, the wipers of said potentiometers being ganged together to provide a proportional change in said second drive signal in response to a change in said first drive signal.

6. In a photography system as recited in claim 4 wherein said mirror drive means includes, an electric motor, and means for maintaining the operational speed of said motor constant for a particular setting of said variable control means.

7. In a photography system as recited in claim 4 wherein said film drive means includes, an electric motor, and means for maintaining the operational speed of said motor constant for a particular setting of said variable control means.

8. In a photography system as recited in claim 4 wherein said variable control means includes an adjustable power supply means for developing one of said drive signals and a signal divider responsive to said one drive signal and operative to develop the other of said drive signals.

9. An image motion compensation means for a photography system designed to photograph objects moving relative thereto and having a film drive means for moving a photographic film past an exposure aperture at a motion compensated speed, comprising:

a variable control means for developing a first drive signal and a second drive signal proportionally related thereto, said film drive means being responsive to said second drive signal; and an optical means for developing an image of said object and including a scanning means responsive to said first drive signal and operative to scan said photographic object in a direction parallel to the direction of relative movement, said image appearing stationary when said first drive signal has a predetermined relationship to the ratio between the speed of said system relative to said object and the distance therebetween.

10. An image motion compensation means as recited in claim 9 wherein said scanning means includes a reflector which is caused to rotate at a selected angular velocity $\omega$ about an axis transverse to said direction of relative movement.

11. An image motion compensation means as recited in claim 10 wherein said angular velocity $\omega$ may be expressed as $$\omega = (V/2H)\cos^2\theta$$

where
$V$ is the relative velocity between said system and said object,
$H$ is the distance between said system and said object, and
$\theta$ is an instantaneous viewing angle measured from a normal to said direction of relative movement.

12. An image motion compensation means for a photography system as recited in claim 9 wherein said scanning means includes a rotatable mirror and a mirror drive means responsive to said first drive signal and operative to rotate said mirror at an angular velocity $\omega$ about an axis transverse to said direction of movement, said angular velocity $\omega$ being expressed as $$\omega = (V/2H)\cos^2\theta$$

where
$V$ is the relative velocity between said system and said object,
$H$ is the separation between said system and said object, and
$\theta$ is an instantaneous viewing angle measured from a normal to said direction of relative movement.

13. An image motion compensation means for a photography system as recited in claim 12 wherein said mirror drive means includes an electric motor and means for maintaining the operational speed of said motor constant for a particular setting of said variable control means 14. In a photography system having means for compensating for relative motion between a camera and an image of an object being photographed, an improved motion compensating means comprising:

an optical means including, a viewing window defining an optical axis, a rotatably mounted mirror for reflecting the image of the relatively moving object along said optical axis, and a mirror drive means responsive to a first drive signal for angularly moving said mirror at a rate to maintain the image stationary along said optical axis;

control means responsive to an input commensurate with the ratio of the relative lateral velocity of said camera with respect to said object and the distance between said camera and said object, and operative to develop said first drive signal commensurate with said ratio, and a second drive signal which is proportional to said first drive signal; and a camera including a film drive means responsive to said second drive signal and operative to move the film to compensate for the relative motion between the camera and the object being photographed.

* * * * *